US012088247B2

(12) United States Patent
Luangrath et al.

(10) Patent No.: US 12,088,247 B2
(45) Date of Patent: Sep. 10, 2024

(54) MODULAR PHOTOVOLTAIC POWER PRODUCTION SYSTEM

(71) Applicant: Inergy Holdings, LLC, Chubbuck, ID (US)

(72) Inventors: Sean Luangrath, Highland, UT (US); Zachary Blume, Orem, UT (US)

(73) Assignee: INERGY HOLDINGS, LLC., Chubbuck, ID (US)

( * ) Notice: Subject to any disclaimer, the term of this patent is extended or adjusted under 35 U.S.C. 154(b) by 0 days.

(21) Appl. No.: 17/900,855

(22) Filed: Aug. 31, 2022

(65) Prior Publication Data

US 2023/0412123 A1      Dec. 21, 2023

Related U.S. Application Data

(60) Provisional application No. 63/344,479, filed on May 20, 2022.

(51) Int. Cl.
| | |
|---|---|
| *H02S 40/36* | (2014.01) |
| *H02S 20/25* | (2014.01) |
| *H02S 30/10* | (2014.01) |
| *H02S 40/32* | (2014.01) |
| *H02S 50/00* | (2014.01) |

(52) U.S. Cl.
CPC ............. *H02S 40/36* (2014.12); *H02S 20/25* (2014.12); *H02S 30/10* (2014.12); *H02S 40/32* (2014.12); *H02S 50/00* (2013.01)

(58) Field of Classification Search
CPC .......... H02S 40/36; H02S 20/25; H02S 30/10; H02S 40/32; H02S 50/00; H02S 40/34; H02J 7/00032
See application file for complete search history.

(56) References Cited

U.S. PATENT DOCUMENTS

| | | | |
|---|---|---|---|
| 3,984,881 | A | 10/1976 | Gerlach |
| 4,219,011 | A | 8/1980 | Knoos |

(Continued)

FOREIGN PATENT DOCUMENTS

| | | |
|---|---|---|
| AT | 512547 | 11/2014 |
| CN | 1322593 | 6/2007 |

(Continued)

*Primary Examiner* — Michael Y Sun
(74) *Attorney, Agent, or Firm* — Kunzler Bean & Adamson

(57) ABSTRACT

Apparatuses and systems are presented for photovoltaic power production. A plurality of adaptive solar panels comprise photovoltaic faces and connective edge faces. Connective edge faces each comprise a panel connection interface so that the plurality of adaptive solar panels are releasably affixed one to another in configurations adaptive to surfaces and environmental geometric space constraints. Connective edge faces each further comprise a panel electrical connector such that the plurality of adaptive solar panels are releasably electrically connectable. One or more adaptive connection units comprise unit connection interfaces so that the one or more adaptive connection units are releasably affixed to the plurality of adaptive solar panels. One or more adaptive connection units further comprise one or more connection electrical connectors so that the one or more adaptive connection units are releasably electrically connectable to the plurality of adaptive solar panels.

16 Claims, 13 Drawing Sheets

(56) References Cited

U.S. PATENT DOCUMENTS

| | | |
|---|---|---|
| 4,718,185 A | 1/1988 | Conlin et al. |
| 4,786,795 A | 11/1988 | Kurashima et al. |
| 5,567,248 A | 10/1996 | Chung |
| 7,411,802 B2 | 8/2008 | Victor et al. |
| D625,251 S | 10/2010 | Workman et al. |
| 7,819,114 B2 | 10/2010 | Augenbraun et al. |
| 7,960,863 B2 | 6/2011 | Fife et al. |
| 8,053,662 B2 | 11/2011 | Khazeni et al. |
| 8,138,413 B2 | 3/2012 | Luch et al. |
| 8,371,076 B2 | 2/2013 | Jones et al. |
| 8,410,350 B2 | 4/2013 | Corrales et al. |
| 9,148,086 B2 | 9/2015 | Fife et al. |
| 9,236,751 B2 | 1/2016 | Goei et al. |
| 9,263,183 B2 | 2/2016 | Chapman et al. |
| 9,422,922 B2 | 8/2016 | Sant'Anselmo et al. |
| 9,640,692 B2 | 5/2017 | Armstrong et al. |
| 9,800,053 B2 | 10/2017 | Beitel et al. |
| 10,135,241 B2 | 11/2018 | Capp et al. |
| 10,404,205 B2 | 9/2019 | Lillywhite et al. |
| 10,523,008 B2 | 12/2019 | Rive et al. |
| 10,530,162 B2 | 1/2020 | Chatterjee et al. |
| 10,547,270 B2 | 1/2020 | Hudson et al. |
| 10,573,176 B2 | 2/2020 | Myer |
| 10,644,180 B2 | 5/2020 | Zimmermann |
| 10,807,685 B2 | 10/2020 | Petrin et al. |
| 10,992,238 B2 | 4/2021 | Yoscovich et al. |
| 11,201,476 B2 | 12/2021 | Yoscovich et al. |
| 2005/0045224 A1 | 3/2005 | Lyden |
| 2008/0194154 A1* | 8/2008 | Minnick ............... H01R 13/111 439/842 |
| 2009/0178709 A1 | 7/2009 | Huber et al. |
| 2010/0116325 A1* | 5/2010 | Nikoonahad ....... H01L 31/0504 136/251 |
| 2011/0290307 A1 | 12/2011 | Workman et al. |
| 2012/0033392 A1* | 2/2012 | Golubovic ............. H02S 40/34 361/752 |
| 2012/0126626 A1 | 5/2012 | Falk et al. |
| 2012/0151721 A1* | 6/2012 | Lin ........................ B25B 5/06 24/457 |
| 2013/0269181 A1 | 10/2013 | McBride et al. |
| 2014/0062191 A1* | 3/2014 | Bryson .................... H02J 1/12 307/26 |
| 2015/0021982 A1* | 1/2015 | Schoepf ................... H02J 7/35 307/77 |
| 2015/0102762 A1 | 4/2015 | Goei et al. |
| 2017/0040801 A1 | 2/2017 | Robison et al. |
| 2017/0085213 A1 | 3/2017 | Petrin et al. |
| 2020/0186054 A1 | 6/2020 | Yoscovich |
| 2020/0274483 A1* | 8/2020 | Sanglap ................. H02S 40/34 |
| 2020/0321907 A1* | 10/2020 | Rodrigues ................ E04D 1/34 |
| 2021/0171163 A1 | 6/2021 | Petrin et al. |

FOREIGN PATENT DOCUMENTS

| | | |
|---|---|---|
| CN | 106341083 | 7/2018 |
| CN | 209001679 | 6/2019 |
| CN | 107155399 | 11/2019 |
| CN | 109048943 | 6/2021 |
| DE | 102013223167 | 6/2015 |
| DE | 102019121619 | 2/2021 |
| EP | 1715261 | 8/2012 |
| EP | 2580843 | 5/2017 |
| EP | 2104200 | 2/2019 |
| EP | 3772757 | 2/2021 |
| EP | 3852215 | 7/2021 |
| KR | 101024619 | 3/2011 |
| KR | 101465832 | 11/2014 |
| WO | 2014203093 | 12/2014 |
| WO | 2020254029 | 12/2020 |

* cited by examiner

MODULAR PHOTOVOLTAIC POWER PRODUCTION SYSTEM

FIELD

The present disclosure generally relates to photovoltaic power generation systems and more particularly relates to power generation systems that can be scaled to match demand.

BACKGROUND

People may install solar panels or other power sources that use renewable energy for a variety of reasons. For example, power from renewable energy sources may reduce dependence on non-renewable energy from fossil fuels, reduce carbon emissions, reduce power bills, provide backup power for use in a power outage, provide off-grid power for mobile or remote locations, or the like. Solar panels or other renewable energy sources may be installed in residences, commercial spaces, and other locations. Photovoltaic cells grouped into solar panels can be highly dependent on environmental conditions such as sunlight conditions and the characteristics of the electrical loads placed on the system. For example, a power drop in one or more panel (such as shading or malfunction) may cause a matching power drop in the entire panel array. When designing a solar power system, wires may be manually selected and sized to match power generation levels and predefined voltages, and maximum panel, string and array sizes may be calculated. Creating arrays that meet environmental geometric space constraints may further complicate the design as variations in panel size and string length may be accounted for. Installing a system with sufficient power generation and energy storage capacity to fully meet energy needs, provide room to grow, or provide power outside the system may be cost-prohibitive. Conversely, installing a small system may reduce initial costs but "lock" the users into a system that does not fully meet their needs and that is impractical to expand.

SUMMARY

The following summary provides a basic understanding of some aspects and features of the disclosure. This summary is not extensive, and as such is not intended to particularly identify key and critical elements of the disclosure, or to delineate the scope of the disclosure. Its sole purpose is to present some concepts of the disclosure in simplified form as a prelude to the more detailed description presented below.

A system for modular power production is disclosed. In certain embodiments, a system includes a plurality of adaptive solar panels comprising photovoltaic faces and connective edge faces. Connective edge faces, in one embodiment, each comprise a panel connection interface so that a plurality of adaptive solar panels are releasably affixed one to another in configurations adaptive to surfaces and environmental geometric space constraints. Connective edge faces, in some embodiments, each comprise a panel electrical connector so that a plurality of adaptive solar panels are releasably electrically connectable. One or more adaptive connection units, in certain embodiments, comprise unit connection interfaces so that the one or more adaptive connection units are releasably affixed to a plurality of adaptive solar panels. One or more adaptive connection units, in one embodiment, comprise one or more connection electrical connectors so that the one or more adaptive connection units are releasably electrically connectable to a plurality of adaptive solar panels.

An apparatus for modular power production is disclosed. An apparatus, in one embodiment, includes one or more photovoltaic faces. In some embodiments, an apparatus includes one or more power converters in electrical communication with one or more photovoltaic faces. In certain embodiments, an apparatus includes a controller configured to control power flow through one or more power converters. An apparatus, in a further embodiment, includes a plurality of connective edge faces comprising a panel connection interface in electrical communication with one or more power converters. A panel connection interface, in some embodiments, is configured to be releasable and to output power to one or more power loads.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
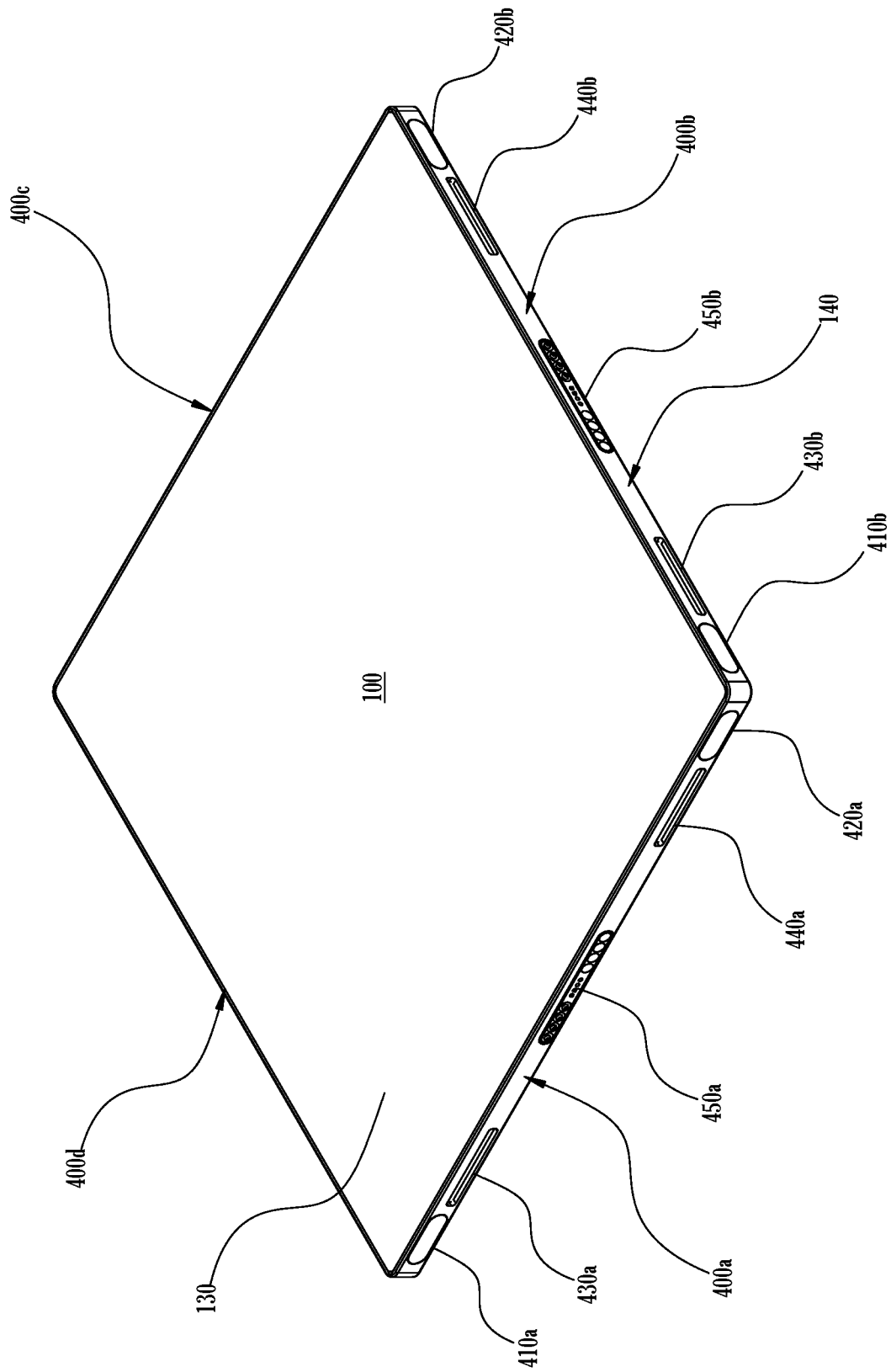
FIG. 1 is a perspective view illustrating one embodiment of an adaptive solar panel.

Reference throughout this specification to "one embodiment", "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of controllers. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a controller to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Reference will be made throughout this specification to various terms related to the field of photovoltaics. Terms such a "solar cell", "photovoltaic ("PV") cell", and the like, are well understood and defined in the art. It will be understood that "solar panels", "PV panels", "PV modules", and the like may refer to a collection of any number of solar cells. Further "solar panel string", "panel string", "PV string" and the like may refer to any number of solar panels arranged in series electrical connection. Yet further, "solar panel array", "panel array", "PV array" and the like may refer to any number of solar panels strings arranged in parallel electrical connection to create a solar panel array.

Further reference will be made throughout the specification to "electrical connectors", "releasable connectors", "electrical connection", components that are "coupled", "data connection", "data connector" and the like; it will be understood that a variety of AC and DC connectors and connection means or a combination of such may be substituted for the connector or connection means suggested in this specification. For example, electrical connections may be a trace connection on a printed circuit board ("PCB"), a solder connection, crimp connection, and the like. Further, AC electrical connectors may include: power outlets conforming to the standards of the U.S. National Electrical Manufacturers Association (NEMA) or outlets more commonly used outside North America, such as British, Australian, European, or Japanese sockets, or an "international" socket shaped to accept multiple types of plugs. Further DC electrical connectors may include: 12V cigarette light sockets, universal serial bus ("USB"), MC4, EC8, barrel connectors, screw terminals and the like. When a non-releasable connection (for example a solder connection) is suggested in a particular embodiment a releasable connection mechanism (such as a USB connector) may be used in an alternate embodiment. Likewise, a non-releasable connection mechanism may be used in place of the releasable connection mechanisms suggested in a given embodiment. Additionally, AC type connectors, DC type connectors and data type connectors may all be substituted one to another. Further male connectors may be exchanged for female connectors or a hermaphroditic connector in any given embodiment unless otherwise stated.

FIG. 1 is a perspective view illustrating one embodiment of an adaptive solar panel 100. The adaptive solar panel 100, in the depicted embodiment, includes a photovoltaic face 130 and a number of connective edge faces 400a-d. The connective edge faces 400a-d, in some embodiments, may be identically repeated in structure. In the depicted embodiment, the adaptive solar panel 100 includes one photovoltaic face 130 and four connective edge faces 400; however the number of photovoltaic faces 130 and connective edge faces 400 may vary; resulting in a large number of potential shapes that the adaptive panel 100 may take in given embodiments. The adaptive panel 100 may take the shape of a polygon including, but not limited to, squares, rectangles, cubes, cuboids, cylinders, prisms, polyhedrons, triangles, pyramids, or the like in some embodiments; additionally within the adaptive solar panel 100 the functions imparted to the photovoltaic face(s) 130 may include one or more of the functions imparted to the connective edge face(s) 400. For example, in one embodiment the adaptive panel 100 may be spherical in shape, comprising a single face including the functions of both the photovoltaic face(s) 130 and the connective edge face(s) 400.

Figure 4:
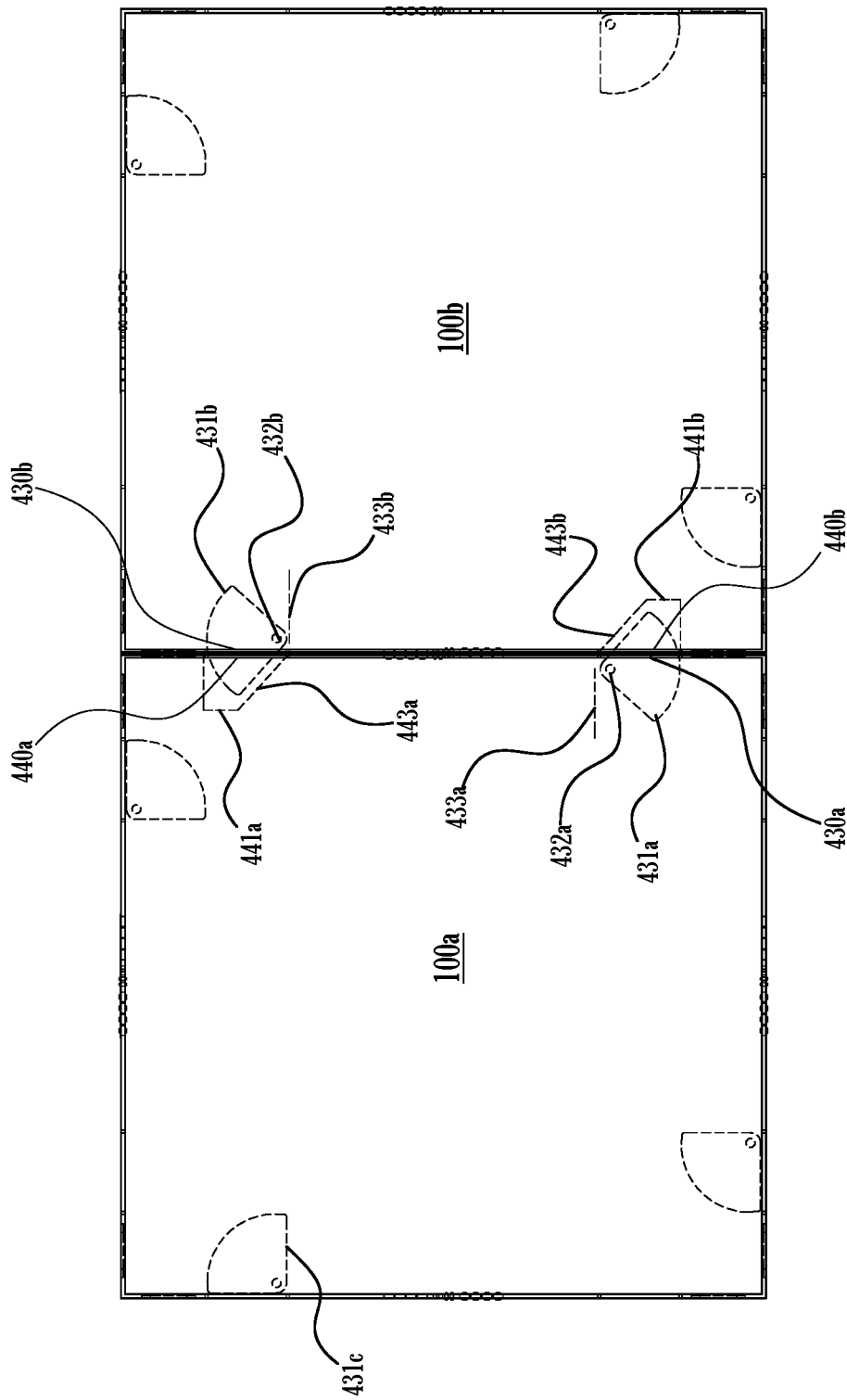
FIG. 4 is atop view illustrating one embodiment of a physical connection interface comprising an extendable wedge shape and receiving pocket.
Figure 5:
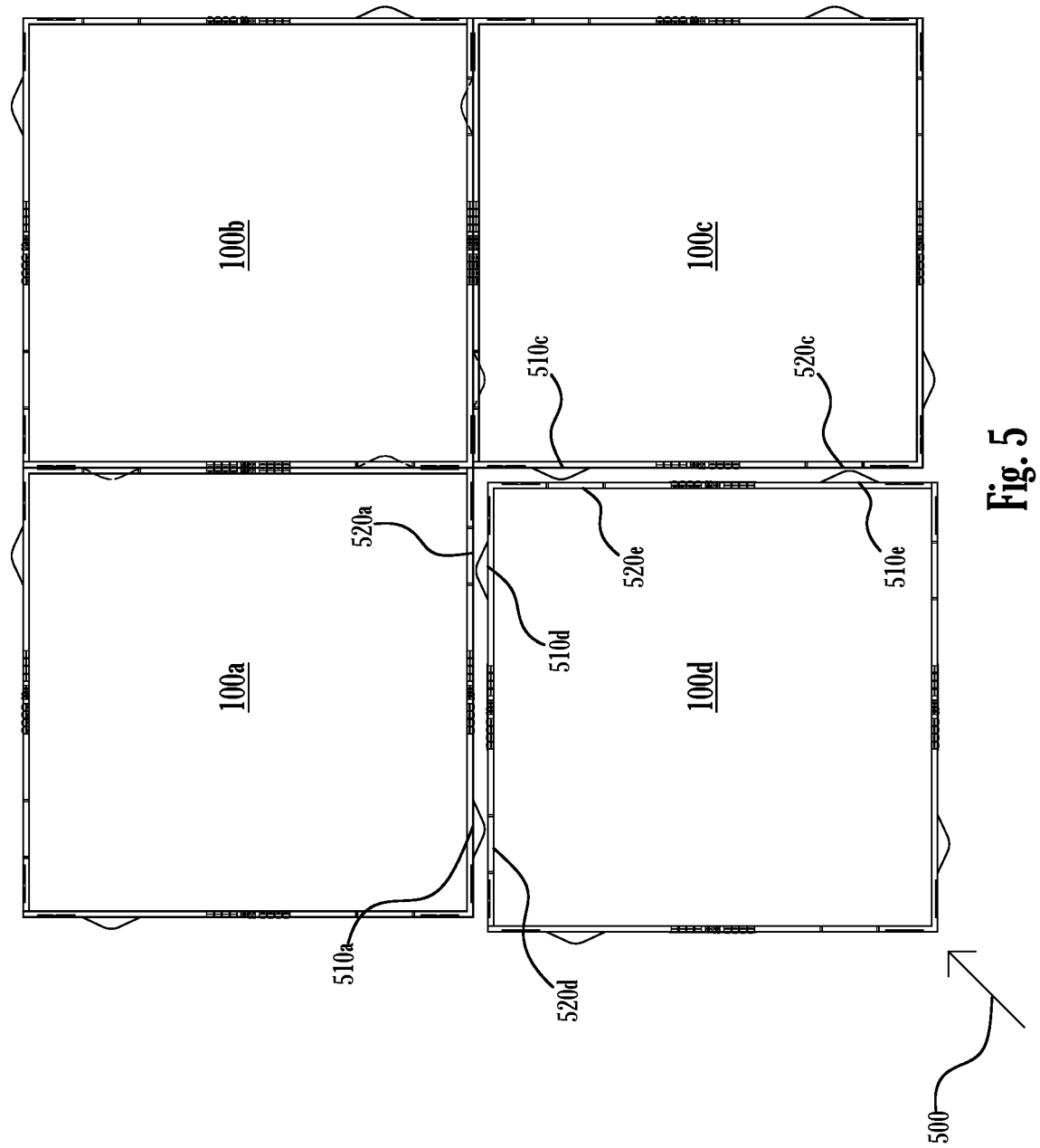
FIG. 5 is atop view illustrating a further embodiment of a physical connection interface comprising an extrusion and receiving pocket.

The connective edge faces 400 in various embodiments include a 'male, tension' physical connection interface 410 and a 'female, tension' physical connection interface 420. The depicted embodiment includes 'north facing' magnets 410 and 'south facing' magnets 420. In other embodiments alternate mechanisms of retention may be used; (two further examples of retention mechanisms are depicted in FIG. 4 and FIG. 5). These magnets 410 and 420 are designed to attract multiple adaptive solar panels 100 into connection and counter tension forces working to separate adaptive solar panels 100. In some embodiments the magnets 410 and 420 are permanent magnets such a neodymium-iron-boron magnets or samarium-cobalt magnets. A variety of other ferromagnetic materials may be used such as iron, cobalt, or nickel. Additionally, magnets may be of a sintered composite structure, nano-structure or cast structure. In the depicted embodiment the magnets are a discorectangle shape, cylinders and/or a variety of other shapes may be used.

The connective edge faces 400 in some embodiments (including the depicted embodiment) further include a 'male, bending/torsion/shear' physical connection interface 430 and a 'female, bending/torsion/shear' physical connection interface 440, interfaces 430 and 440 are designed to counter bending, torsion and shear forces acting on adaptive solar panels 100 following connection of adaptive solar panels 100. This embodiment includes extendable shapes 430 and receiving pockets 440. An embodiment including extendable shapes 430 and receiving pockets 440 is further described with regard to FIG. 4.

Regarding the physical connection interfaces 410, 420, 430, & 440; while in the depicted embodiment a first mechanism is used to retain against tension forces and a second mechanism is used to retain against bending, torsion, and shear forces. Alternate configurations may be used. For example, a single mechanism may be used to retain against all types of forces. Alternatively, a plurality of mechanisms may be used to retain against any combination of types of forces. Mechanisms such as mechanical latches, electromechanical latches, magnetic latches, compliant mechanisms, pins, protrusions, pockets, and the like may be used. Mechanisms may be static, actively controlled or passively controlled. In general it is desirable, but not required that the physical connection interfaces 410, 420, 430, & 440 mechanisms be releasable and permit the connection of adaptive solar panels 100 in any rotation or configuration, and that the mechanism be sufficiently strong to retain against tension, bending, torsion and shear forces which may be generated by forces of nature, wind, gravity, persons, animals, or the like. The amount of retention desired may vary between embodiments depending on application, such as a system used on a residential structure or a portable system used for camping.

The connective edge faces 400 in certain embodiments further include electrical connectors 450, which are generally designed to accept a releasable connection between adaptive solar panels 100 or other units in various configurations and rotations. The electrical connector 450 is further described with regard to FIG. 6.

The components of connective edge faces 400*a*-*d* are designed in a 'male/female' configuration in the depicted embodiment such that adaptive solar panels 100 may be connected one to another in any planar configuration or rotation; more particularly in the depicted embodiment there may be rows or columns of any number of adaptive panels 100, further panels 100 may be connected in any rotation, in increments of 90 degrees. In other embodiments the shape of adaptive panels 100 may permit alternate rotational increments or configurations. In yet other embodiments adaptive solar panels 100 may be connected in non-planar configurations. For example, if the adaptive solar panels 100 were in the shape of a tetrahedron, (with one photovoltaic face 130 and three connective edge faces 400), twenty of these adaptive panels may be arranged with connective faces touching to create an icosahedron (a 20 face polyhedron); in this suggested embodiment all the photovoltaic faces 130 would be facing outward and the connective edge faces 400 would be touching one to another; this example demonstrates that a variety of non-planer configurations are possible in addition to the planar examples that are mainly described in this specification.

The adaptive solar panel 100 in certain embodiments further includes an encasement 140 spanning all faces, with the exemption of the photovoltaic face 130 (in the depicted embodiment). At connective edge faces 400 the encasement 140 includes openings to allow for connective edge face 400 features. In the depicted embodiment the encasement 140 is constructed using 6061 aluminum. In general, a lightweight, rigid material is desirable. In other embodiments the encasement 140 may be an injection molded polymer; composite material, metals and/or the like may also be used. The encasement provides rigidity to the adaptive solar panel 100, further the encasement 100 protects the adaptive solar panel 100 interior from dust, contaminates and moisture, still further the encasement 100 provides mounting points for the components of the adaptive solar panel 100, printed circuit boards, electrical components, a photovoltaic face 130, and/or connectors. Wires and the like can all be mounted to the encasement, using methods common in the art such as fasteners, standoffs, cable clamps, compliant mechanisms, and the like. In one embodiment the encasement 140 may be water resistant for outdoor use. In another embodiment the encasement 140 may include holes for ventilation.

The mechanisms of connective edge faces 400 configure the adaptive solar panel 100 such that it may be quickly and easily deployed and connected to other adaptive solar panels 100 in the system or alternately that they may be quickly disconnected, stored in a compact format, transported, and/or re-deployed.

In the depicted embodiment of panel 100 no user interface components are employed, however in other embodiments power switches, buttons, displays, touch screens, and the like may be included.

Figure 2:
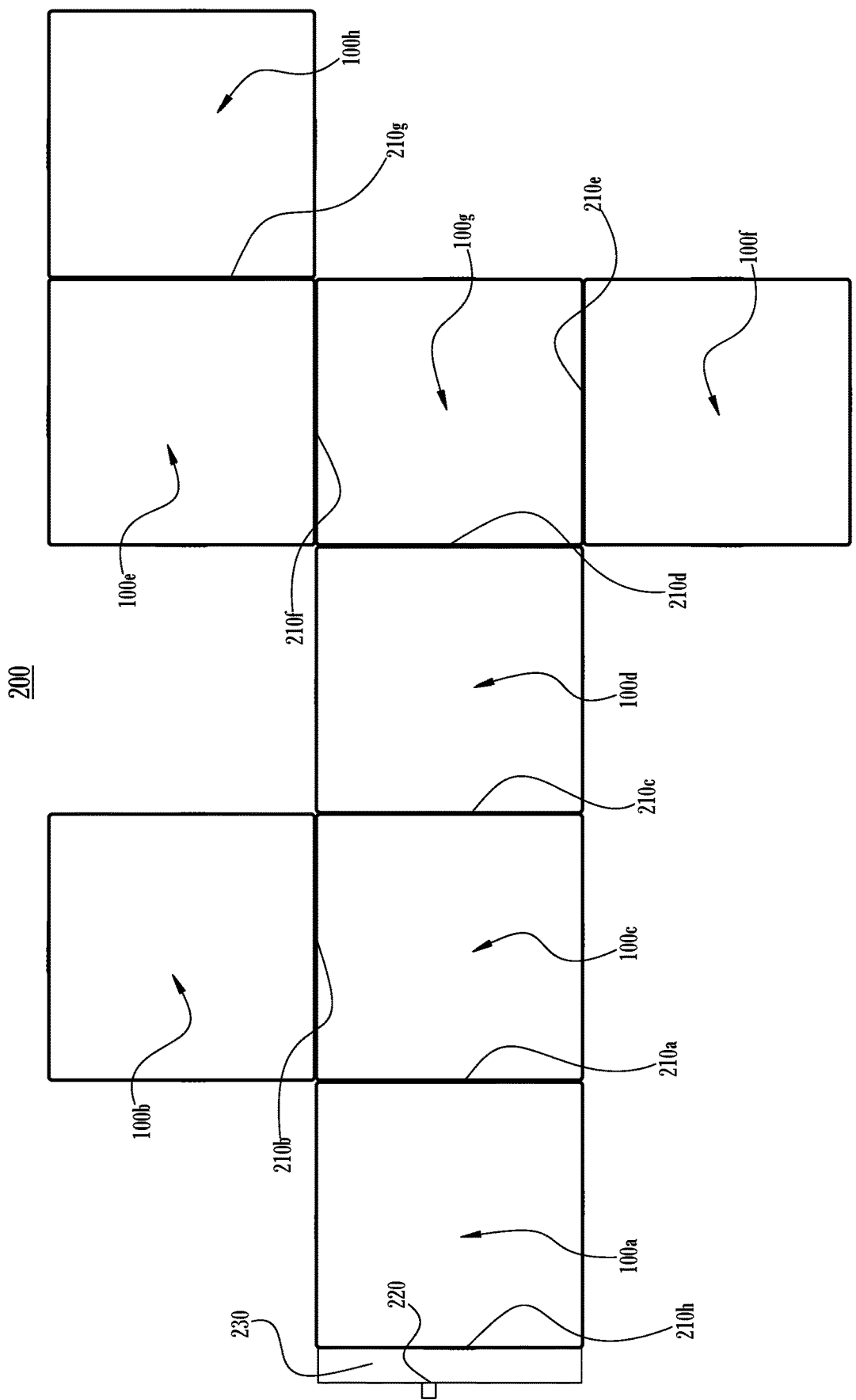
FIG. 2 is atop view illustrating one embodiment of a modular power production system, or array of adaptive solar panels.

FIG. 2 is a top view of a modular power production system 200 in some embodiments including an array of adaptive solar panels 100*a*-*g*. The adaptive solar panels 100*a*-*g* are releasably connected at electromechanical interfaces 210*a*-*g*. The configuration of adaptive solar panels 100*a*-*g* in modular power production system 200 is one embodiment of a wide variety of configurations a user may create including varying columns and rows of varying quantities of adaptive solar panels 100.

An adaptive connection unit 230 in the depicted embodiment is in electromechanical connection with adaptive solar panel 100*a* at interface 210*h*. Adaptive connection units 230 include a variety of modules that facilitate electromechanical connection between sets of adaptive solar panels 100 and/or between adaptive solar panels 100 and electrical loads 220. (A number of adaptive connection unit 230 embodiments are further described with regard to FIGS. 7-11.) In general, adaptive connection units can be simple (a connection between an adaptive solar panel 100 and a load 220) or they can be more complex (including controllers to handle the computations of load handling and the like). In this embodiment, the adaptive connection unit 230 facilitates electromechanical connection between a connected electrical load 220 and the modular power production system 200. In this embodiment, power is routed from adaptive solar panels 100*a*-*g*, through adaptive solar panels 100*a*-*g* to adaptive connection unit 230 to a user electrical load 220. In another embodiment, a system 200 may include more or fewer loads 220, and/or may include loads 220 of types not demonstrated in FIG. 2. For example, a load 220 may be, or may include, an illumination device, a personal electronic device, an electric heater, an air conditioner, a ventilation system, an electric stove or oven, electric clothes washers and dryers, other household appliances, portable electronics or the like. A load 220 may be a device that consumes electrical power or that stores or distributes electrical power, such as a battery bank or a connection to a power grid. The processes by which power may be routed is further described with regard to FIG. 12 and FIG. 13.

Predictions show grown in the consumer solar market in the United States from $10.4 billion in 2021 to 14.1 billion in 2028. These predictions are currently not including markets that are not able to utilize previously available renewable energy options, but by which portable, scalable, easy-to-use, and geometrically adaptive solar panel systems 200 may enable.

Potential markets needing a portable system include, but are not limited to mobile homes, including recreational vehicles (RVs) and tiny homes, even if they remain static; people who like to travel, camp, or hunt; people living in a rental home, including apartments, where solar panels can simply be set on a balcony in order to utilize renewable sources without permanent installation (as prohibited by the lease); "preppers" who are preparing for a natural, political or social disaster and want to be able to survive successfully and efficiently in their homes; disaster relief applications where easy-to-use and renewable power sources may make a huge difference in the success and length of restoration.

Potential markets for a scalable system 200 include, but are not limited to residential, commercial or off-grid installations where either increased monetary funds or increased power demands (e.g., from one or more power loads connected wo one or more adaptive connection units) necessitate an increase in power generation capability. Significant costs can be associated with re-engineering and reworking a designed solar system, alternately costs associated with over-engineering a system for future demand are also high.

Potential markets for an easy-to-use system 200 include, but are not limited to residential consumers; many markets have demonstrated that mass adoption occurs when a user-friendly version of a product is released; for example many have suggested that in the 2000s use of personal MP3 players and smartphones was extremely limited until user-friendly models were developed, at which time use exploded and many new markets were opened. Potentially less obvious are the possible benefits for commercial installers, which may require significant engineering, planning and field labor to wire individual solar panels; as labor wages rise, solutions that decrease installation time, decrease skill required, decrease rework and/or move labor from outdoor field work to a scaled manufacturing operation may be beneficial.

Potential markets for a geometrically adaptive system 200 include, but are not limited to residential or commercial roof installations where an adaptive installation can more effectively conform to roof features such as gables, eves, roof lines, chimneys, vents, and the like; improved coverage can result in increased power generation and a more aesthetically pleasing system 200; additionally, RVs of varying sizes and areas with shading to be avoided benefit from geometric adaptability.

Figure 3:
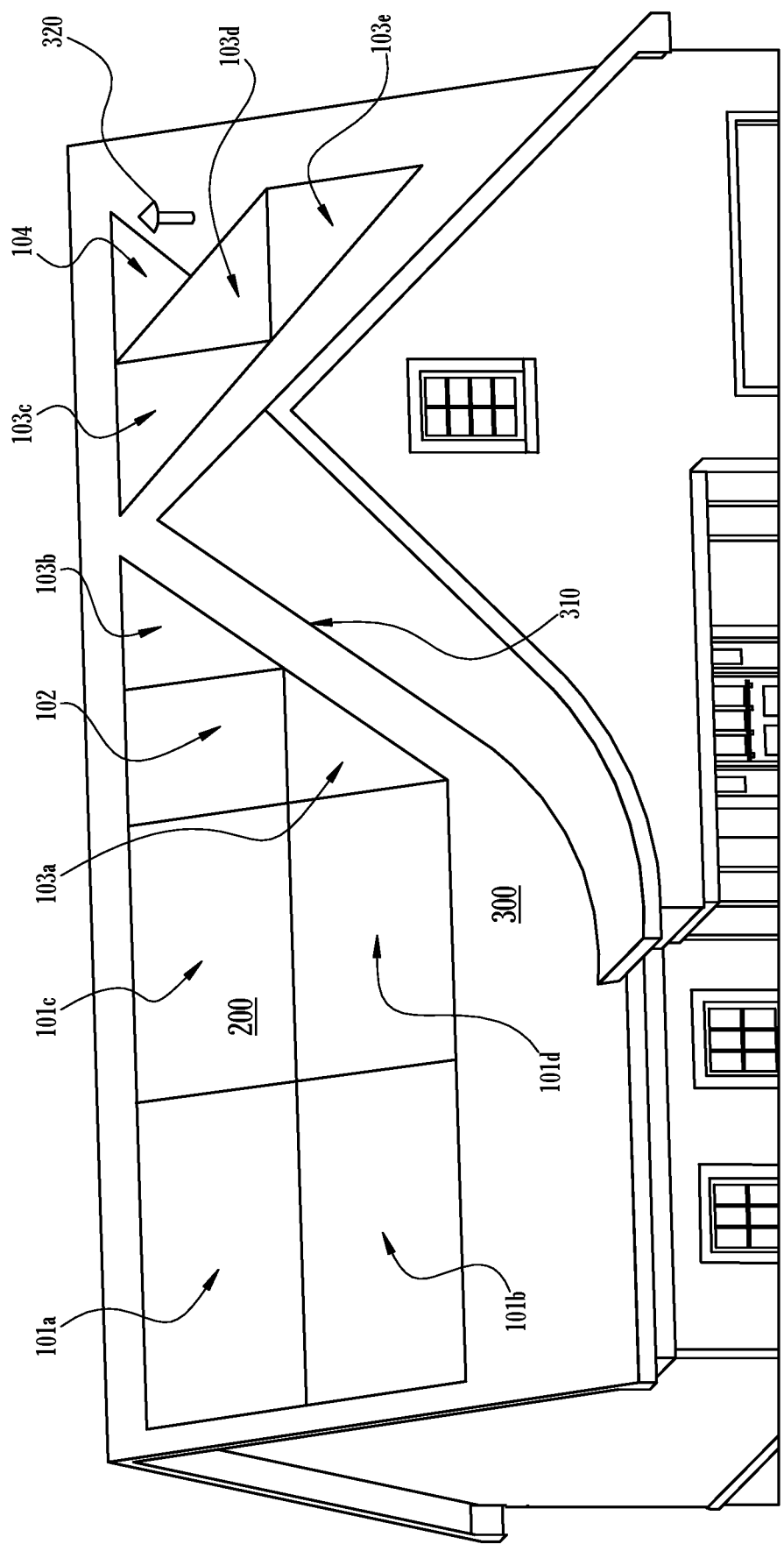
FIG. 3 is a perspective view illustrating one embodiment of a building structure roof demonstrating the geometric adaptability of the adaptive solar panels.

FIG. 3 is a perspective illustration of a building structure roof 300 demonstrating the adaptability of the adaptive solar panels 100. Many modern solar panel systems are limited in that solar panels in a panel string are restricted to a uniform power output (and by extension uniform shapes and sizes of panels in a string are generally used). Additionally, it is common that solar panels strings in a solar panel array are limited to a uniform power output (and by extension uniform string lengths are often used). The modular power production system 200 is configured with adaptive solar panels 100. The adaptive solar panels 100 are configured to intelligently handle loads and power generation such that varying sizes of panels may be used and/or that varying configurations may be used thereby enhancing user flexibility. The process by which power is intelligently handled is further described with regard to FIG. 12 and FIG. 13.

A modular power production system 200 in the depicted embodiment includes large rectangular adaptive solar panels 101a-d, medium square adaptive solar panel 102, medium triangular solar panels 103a-e and small triangular adaptive solar panel 104. The arrangement of adaptive solar panels 100 in this embodiment of modular power production system 200 results in an improved usage (and therefore power generation) of building structure roof 300 when compared to solar panels common in the art that are of a uniform shape and size. The variety in size and shape permits the system to be configured to conform to geometric constraints; in some embodiments the geometric constraints may exist in a 2-dimensional or 3-dimensional space. Also, note the conformity of the modular power production system 200 to roof line 310, and the mitigation of a protrusion (heat vent 320). In other embodiments system 200 may contain adaptive panels 100 of other shapes and sizes to handle various geometric constraints.

FIG. 4 is atop view illustrating a male physical connection interface 430a-b and a female connection interface 440a-b.

In this embodiment male physical connection interface 430a-b includes extendable shapes 431a-c and a pivot point 432a-b about which the extendable shapes 431a-c may rotate. Male physical connection interface 430a-b further includes weaker magnets 433a-b such that absent any external force the extendable shape 431 is in the retracted position, such as in the extendable shape 431c. In this embodiment the extendable shapes 431 are wedge shapes made of 6061 aluminum, in other embodiments any sufficiently rigid and durable material may be used.

The female connection interface 440a-b in some embodiments includes pockets 441a-b and stronger magnets 443a-b such that when adaptive solar panels 100a and 100b are brought into connection stronger magnets 443a-b overpower weaker magnets 433a-b and extendable shapes 431 are brought into the extended position, as shown in the extendable shapes 431a-b. In another embodiment magnets 433a-b and magnets 443a-b may be electromagnets manipulated by a controller, thereby controlling the extended or retracted positions of extendable shapes 431 using active control, rather than passive control with a weak/strong magnet combination.

In the extended position extendable shapes 431 positively engage with pockets 441 and counter bending, torsion and shear forces acting on adaptive solar panels 100 following connection of adaptive solar panels 100, in some embodiments. The extendable shapes 431 engage with the pockets 441 by at least a proportion of 1/20 of the total width of the adaptive solar panel 100 in the depicted embodiment. In the retracted position extendable shapes 431 maintain a profile inside adaptive solar panel 100 encasement 140 which prevents snagging during transportation or other activities.

FIG. 5 is a top view illustrating an alternate embodiment of a physical connection interface that has static wedge shapes 510a,c,d,e and receiving pockets 520a,c,d,e in the depicted embodiment. Adaptive solar panels 100a-c are connected such that a 'corner' configuration is created (meaning that two already connected panels 100 are configured such that panel 100d to be connected must interface on two connective edge faces 400, the connective edge faces being located perpendicularly to each other). Adaptive solar panel 100d is in the process of being connected to adaptive solar panels 100a and 100c. Adaptive solar panel 100d is being pushed in the direction indicated by arrow 500. Static wedge shape 510a of adaptive solar panel 100a is engaging with receiving pocket 520d of adaptive solar panel 100d. Similarly, static wedge shape 510e of adaptive solar panel 100d is engaging with pocket 520c of adaptive solar panel 100c. The remaining static wedge shapes 510 are engaging with pockets 520 in a similar fashion. The static wedge shapes 510 are designed as isosceles triangles with obtuse angles of at least 120 degrees in this embodiment. The shape permits adaptive solar panel 100d to be inserted into a corner configuration scenario. The shape of static wedge shapes 510 has the further benefit that it may not be as prone to snagging during handling, such as when being put into a backpack or bag. Alternate embodiments with shapes such as pins and bushings are viable, however in those embodiments the adaptive solar panels 100 may have to be connected in such an order that corner configurations are not encountered; an example of the connection process with a pin and bushing embodiment may be first connecting adaptive solar panels 100a and 100d, then connecting adaptive solar panels 100b and 100c, while finally connecting the pair of 100a and 100d to the pair of 100b and 100c creating a square configuration.

Figure 6:
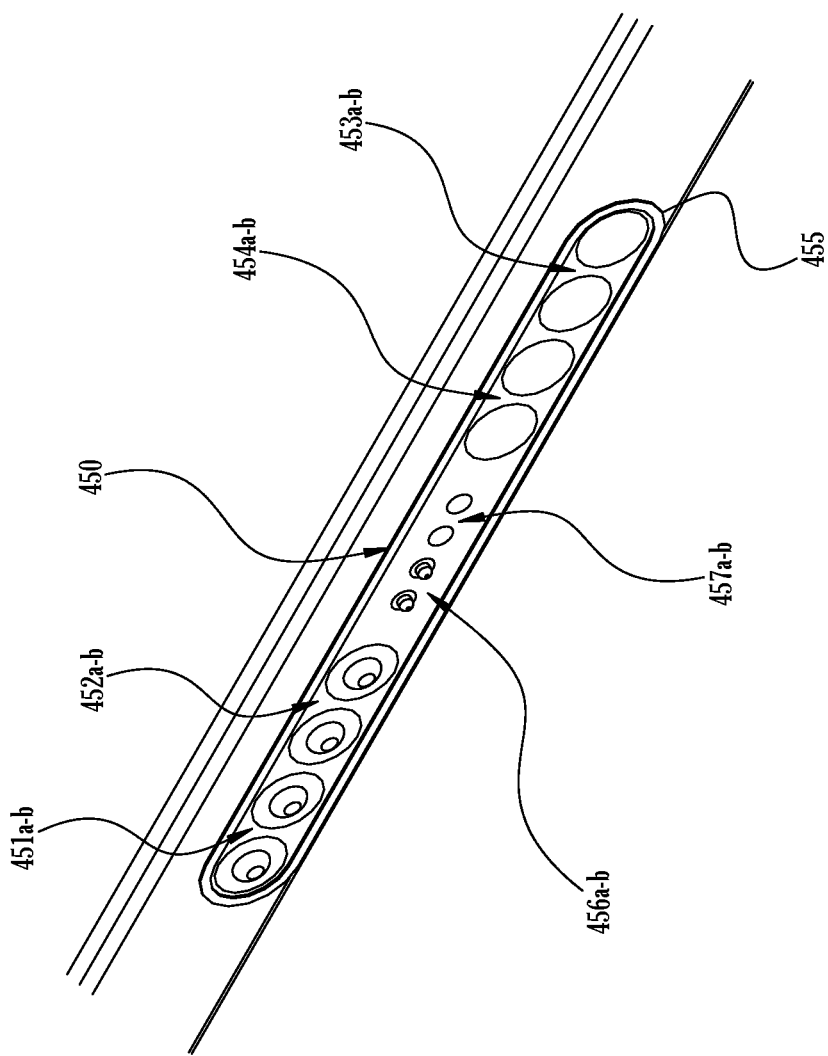
FIG. 6 is a perspective view illustrating one embodiment of an electrical connector.

FIG. 6 is a perspective illustration of an electrical connector 450. In this embodiment the electrical connector 450 includes male positive connectors 451a-b, male negative connectors 452a-b, female negative connectors 454a-b, male positive connectors 453a-b, male data connectors 456a-b and female data connectors 457a-b and seal 455. The male/female arrangement is designed such that adaptive solar panels 100 may be releasably connected in any planar rotation or configuration. The seal 455 protects the electrical circuit from moisture and debris while adaptive solar panels 100 are interconnected.

In the depicted embodiment seal 455 extends about the perimeter of electrical connector 450 and is designed to resist moisture and other contaminates that may come into contact with connectors 451, 452, 453, 454, 456, and/or 457. In this embodiment seal 455 is a nitrile seal capable of deforming to maintain a seal under misalignment or introduction of small contaminates when coming into contact with another seal. In other embodiments seal 455 may be constructed of neoprene, ethylene propylene, silicone, fluorocarbon, and PTFE or other materials.

In this embodiment connectors 451, 452, 453, 454, 456, and 457 are constructed of gold coated copper, a combination that provided preferred mechanical properties, conductivity and corrosion resistance. Alternate materials may be used such as, but not limited to brass, aluminum, phosphor bronze, or beryllium copper; with or without coatings such as gold, nickel or tin. In some embodiments individual connectors 451, 452, 453, 454, 456, and 457 may be constructed of like or differing materials suited to individual function.

In the depicted embodiment the connectors 451a-b, 452a-b, and 456a-b are convex shaped compliant mechanisms that permit the connectors to maintain contact under certain levels of contamination, misalignment, and other adverse factors. It will be understood that in other embodiments alternate numbers of connectors, order of connectors and alternate styles of connectors may be used in any order. In the depicted embodiment a male/female configuration is arranged in such a way to allow panels 100 to be arranged in any planar configuration or rotation, while still maintaining male to female connector contact at each pair; in other embodiments hermaphroditic connectors may also be used to accomplish this purpose.

Figure 7:
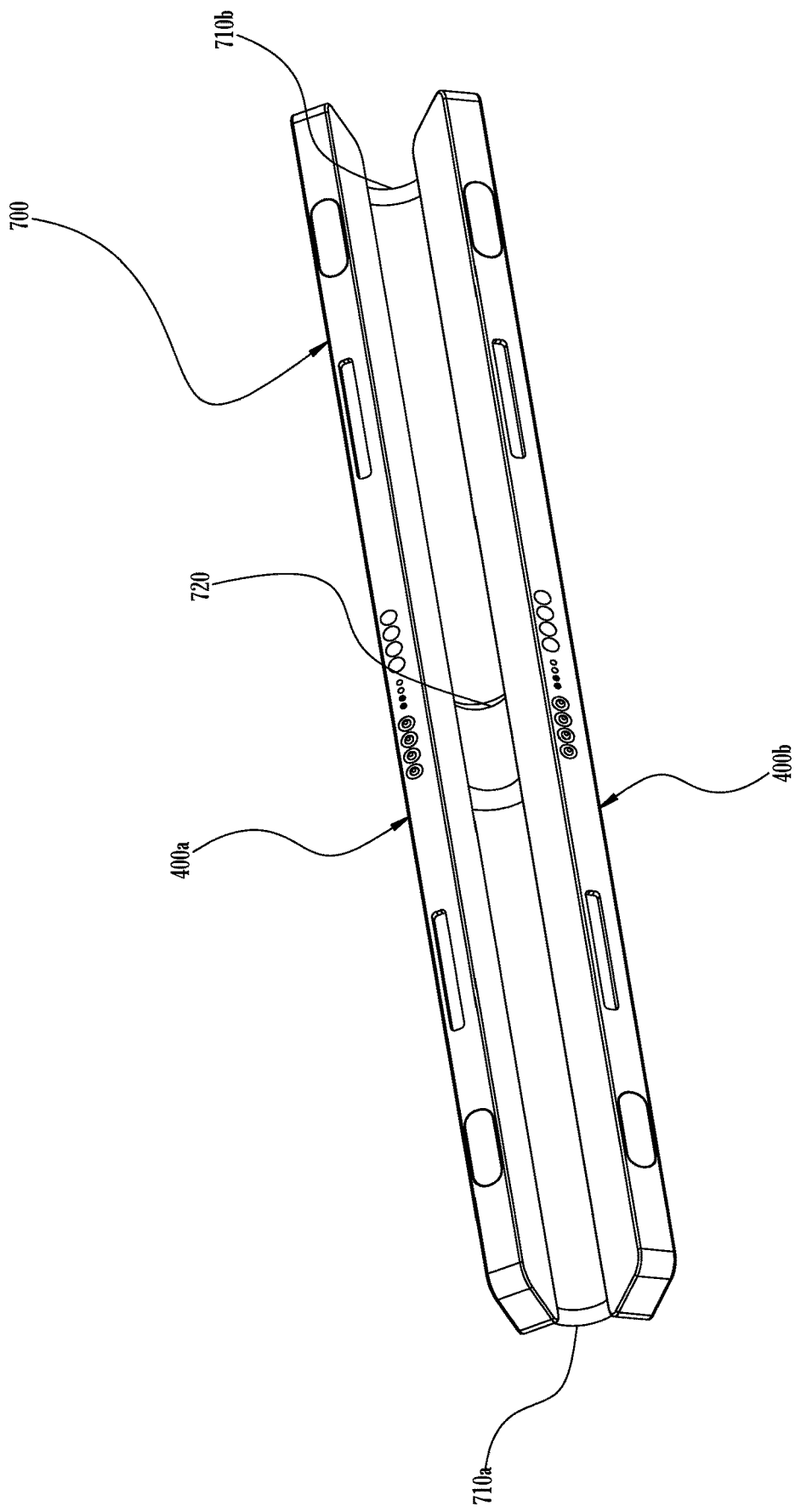
FIG. 7 is a perspective view illustrating one embodiment of an adaptive connection unit, comprising a flexible connector.

FIG. 7 is a perspective illustration of a particular adaptive connection unit embodiment 700, also referred to as a 'flex connector'. The flex connector 700 in the depicted embodiment includes two connective edge faces 400a-b. Connective edge faces 400a-b include elements as described with regard to FIG. 6. Connective edge faces 400a-b are joined in electrical connection by a flexible electrical cable 720. Flex connector 700 may be joined by connective edge faces 400a-b to a combination of two adaptive solar panels 100, adaptive connection units or a combination of an adaptive panel 100 and adaptive unit, creating an electrical connection while allowing the user to adjust the angle between connected units. The flex connector 700 further includes flexible mechanical cables 710a-b which provide stability and prevent the twisting of flexible electrical cable 720.

The flex connector 700 may be used for a variety of purposes such as connecting groups of adaptive solar panels 100 where there is an angle change in the mounting or resting surface. Further, the flex connector 700 may be used to attach an alternate adaptive connection unit embodiment where flexibility between the adaptive solar panels 100 is desired; for example, a battery module to be placed underneath an adaptive solar panel to save space. Further, flex connector 700 in one embodiment may be used to create an "A-frame structure" (using the flex connector 700 at the apex) and adaptive solar panels 100 being the sides walls of the A-frame structure; this may be viable in a camping environment or when a mounting structure is not readily available.

Figure 8:
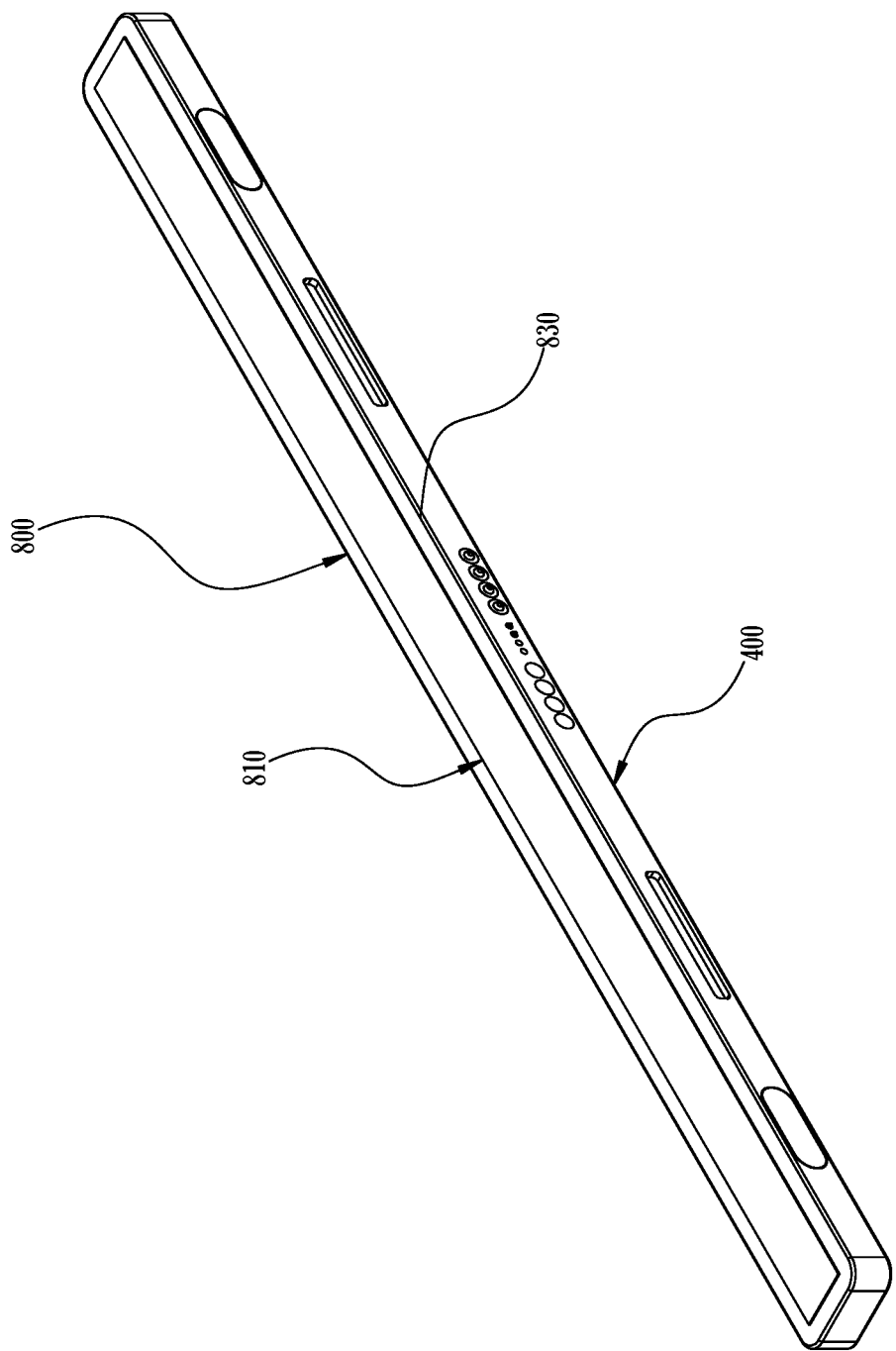
FIG. 8 is a perspective view illustrating a further embodiment of an adaptive connection unit, comprising an illumination device.

FIG. 8 is a perspective illustration of a particular adaptive connection unit embodiment 800, also referred to as a 'light module' 800. Light module 800 in certain embodiments includes an illumination device 810, which includes LEDs or another illumination device. Light module 800 further includes a connective edge face 400 such that Light module 800 may be connected electrically to an adaptive solar panel or adaptive connection unit in order to receive electrical power, for illumination device 810. Light module 800 further includes a controller 830 in electrical connection and communication with connective edge face 400 and in further electrical connection with illumination device 810 such that illumination of device 810 may be modulated. Connective edge face 400 includes elements as described with regard to previous FIG. 6.

In other embodiments, the light module 800 may be a variety of shapes, sizes, and lumen outputs depending on application. Additionally, in other embodiments it may include an extension wire, angle adjustments (such as with a detent mechanism), a hook or other means for hanging the module 800, and/or color adjustments using RGB LED (or other technology). In further embodiments, light module 800 may include a battery such that it may be charged and disconnected for portable use.

Figure 9:
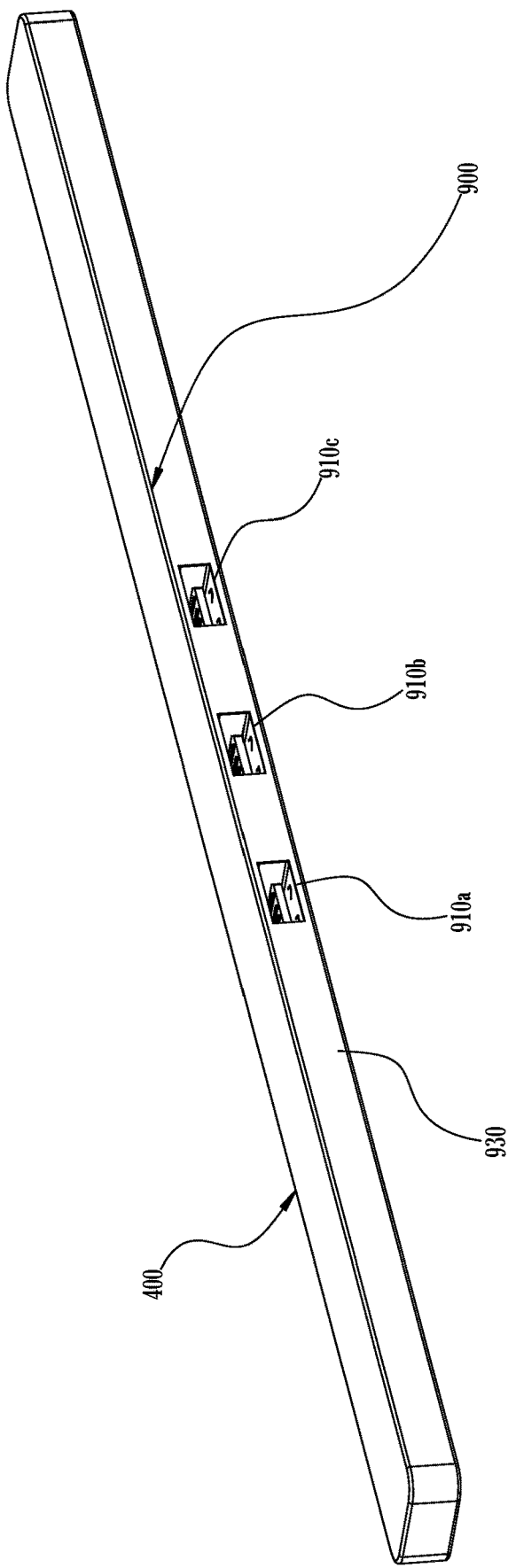
FIG. 9 is a perspective view illustration a certain embodiment of an adaptive connection unit, comprising USB outputs.

FIG. 9 is a perspective illustration of a particular adaptive connection unit embodiment 900, also referred to as a 'USB module' 900. USB module 900 includes in certain embodiments a number of universal serial bus ("USB") outputs 910a-c. USB module 900 further includes a connective edge face 400 such that USB module 900 may be connected electrically to an adaptive solar panel or adaptive connection unit in order to receive electrical power for USB output 910a-c. USB outputs 910a-c may be used to power compatible electrical devices. USB module 900 further includes a controller 930 in electrical connection and communication with connective edge face 400 and in further electrical connection with USB outputs 910a-c such that controller 930 may monitor and modulate the power output of USB outputs 910a-c. Connective edge face 400 includes elements as described with regard to previous FIG. 6.

It will be understood that in other embodiments a variety of quantities and types of connection ports may be included in place, or in addition to outputs 910. Additionally, in some embodiments ports may be used for power and/or data, data ports may be useful for system diagnostics or data transfer.

Figure 10:
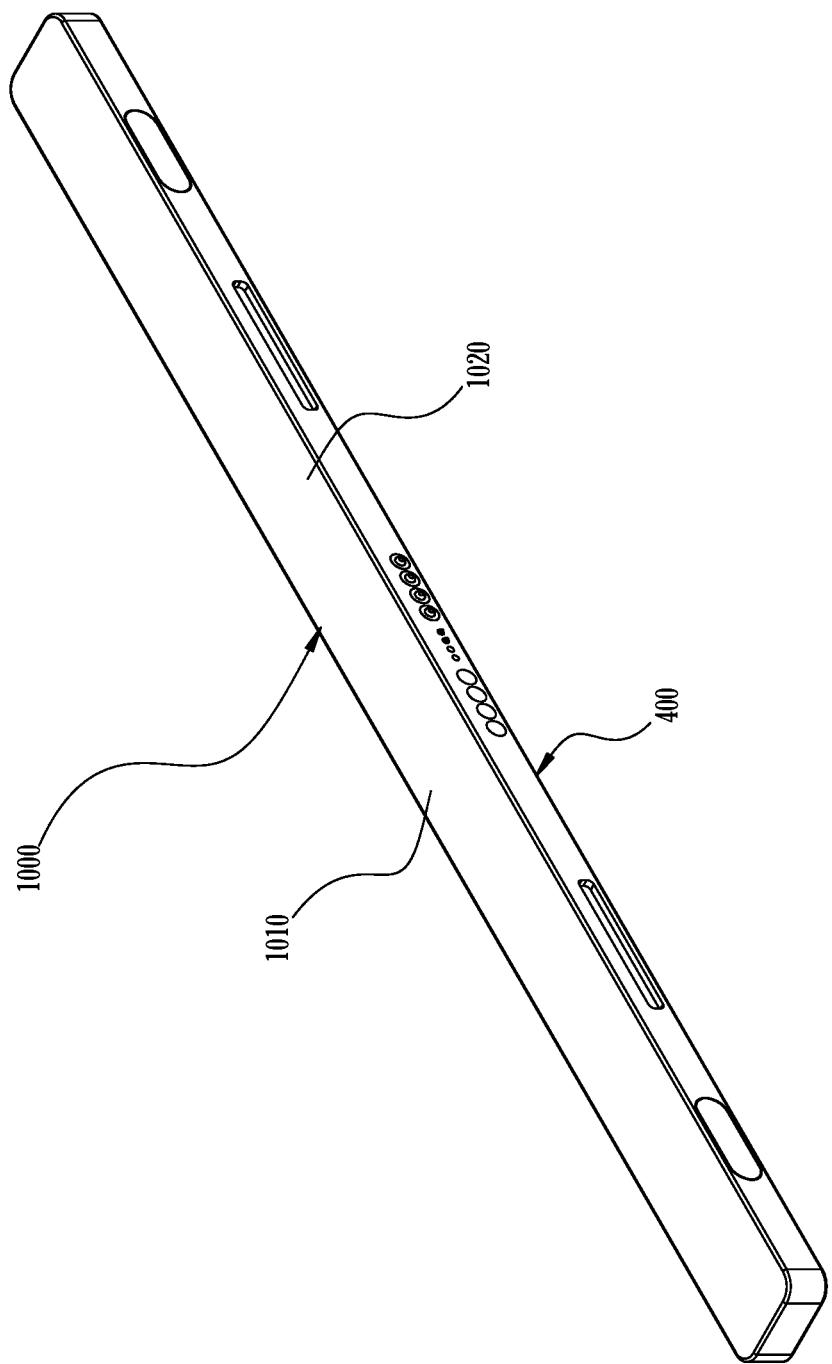
FIG. 10 is a perspective view illustrating one embodiment of an adaptive connection unit, comprising a battery.

FIG. 10 is a perspective illustration of a particular adaptive connection unit embodiment 1000, also referred to as a 'battery module' 1000. Battery module 1000 in the depicted embodiment includes a battery pack ("battery") 1010. Battery pack 1010 consists of battery cells and a battery management system in the depicted embodiment. In other embodiments a battery protection circuit or low voltage disconnect may be used. Battery pack 1010, in the depicted embodiment, may be rechargeable batteries such as lithium ion batteries, lead-acid batteries, or the like. In another embodiment, another energy storage component may be used. Battery 1010 is contained in the housing of battery module 1000. The battery module 1000 further includes a connective edge face 400 such that battery module 1000 may be connected electrically to an adaptive solar panel 100 or adaptive connection unit in order to receive electrical power. In some embodiments, after charging battery module 1000 may be disconnected from an adaptive panel and connected to an adaptive module, such as a light module in order to provide portable power. Battery module 1000 further includes a charge controller 1020 contained in the housing of battery module 1000. Charge controller 1020 is in electrical connection and communication with connective edge face 400 and in further electrical connection with battery 1010 such that charge controller 1020 may modulate the flow of power in and out of the battery 1010. Connective edge face 400 includes elements as described with regard to previous FIG. 6.

In an alternate embodiment, the battery module 1000 may be a flat shape matching the perimeter of adaptive solar panel 100 on three sides, such that it rests against the face opposite the PV face 130 of adaptive panel 100; but protrudes around the perimeter of adaptive panel 100 on one side to maintain a connective edge face 400 in connection with adaptive panel 100. Such an embodiment may create a compact, sleek and portable combination.

Figure 11:
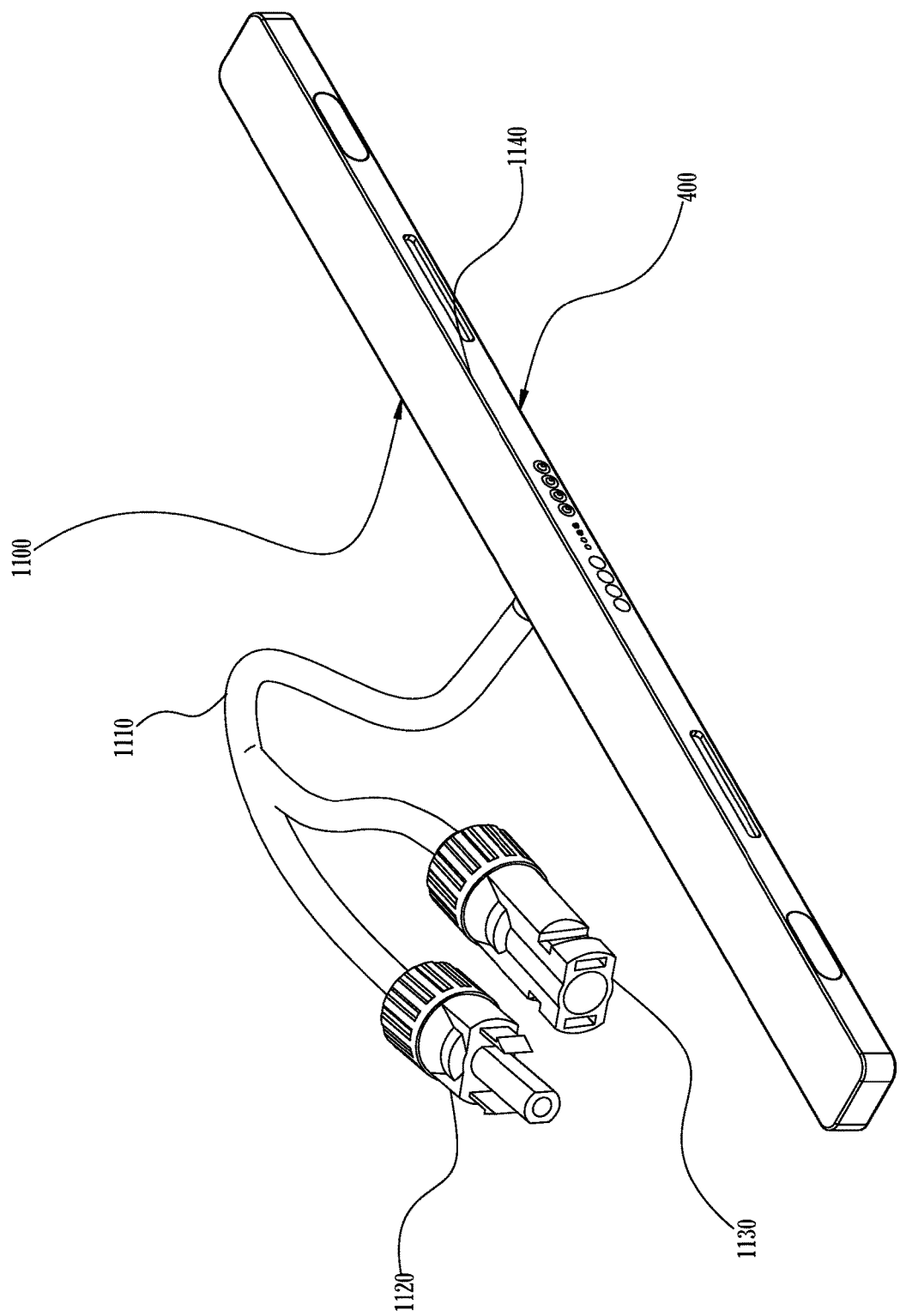
FIG. 11 is a perspective view illustrating another embodiment of an adaptive connection unit, comprising a MC4 connector.

FIG. 11 is a perspective illustration of a particular adaptive connection unit embodiment 1100, also referred to as an 'output/input adapter' 1100. Output/input adapter 1100 in this embodiment includes an adapter assembly 1110. In this embodiment, the adapter assembly is in electrical connection with a male MC4 connector 1120 and a female MC4 connector 1130 (which connectors are commonly used in the art for solar applications); alternate embodiments may use other connectors. Adapter 1110 may be used as an input or output for electrical power between the system and compatible electrical loads or electrical generation devices. Output/input adapter 1100 further includes a connective edge face 400 such that output/input adapter 1100 may be connected electrically to an adaptive solar panel or adaptive connection unit in order to send and/or receive electrical power to and/or from adapter assembly 1110. Output/input adapter 1100 further includes a controller 1140 in electrical connection and communication with connective edge face 400 and in further electrical connection with adapter assembly 1110 such that controller 1140 may monitor and modulate the power output/input of adapter assembly 1110. Connective edge face 400 includes elements as described with regard to previous FIG. 6.

Output/input adapter 1100 in some embodiments may be used to output power to a residential or commercial solar system, such as if a homeowner desired to supplement an existing residential solar system with adaptive system 200; adapter 1100 may be plugged into an existing generic MPPT or inverter. Additionally, adapter 1100 may be utilized to supplement system 200 with additional power from a generic solar panel.

It will be understood that additional adaptive connection unit embodiments exist in addition to the few that have been depicted. One such embodiment may be a frame structure that interacts with the connective edge faces 400 of adaptive solar panels 100 to provide additional rigidity and/or provide a specific geometric shape to system 200 and/or provide mounting holes such that the system may be affixed to a roof or other structure; shapes such as an "A-frame" may maximize solar power generation while, for example, camping; alternatively a "sawtooth" patterned frame may be used in, for example, large commercial installations. Other possible adaptive connection unit embodiments may include but are not limited to a wired or wireless audio or speaker system, electrical discharge insect control system ("bug zapper"), MPPT control system, electrical inverter, solar rapid shutdown system, a fan, a climate control system, and/or a battery management system used to connect to third party batteries.

Figure 12:
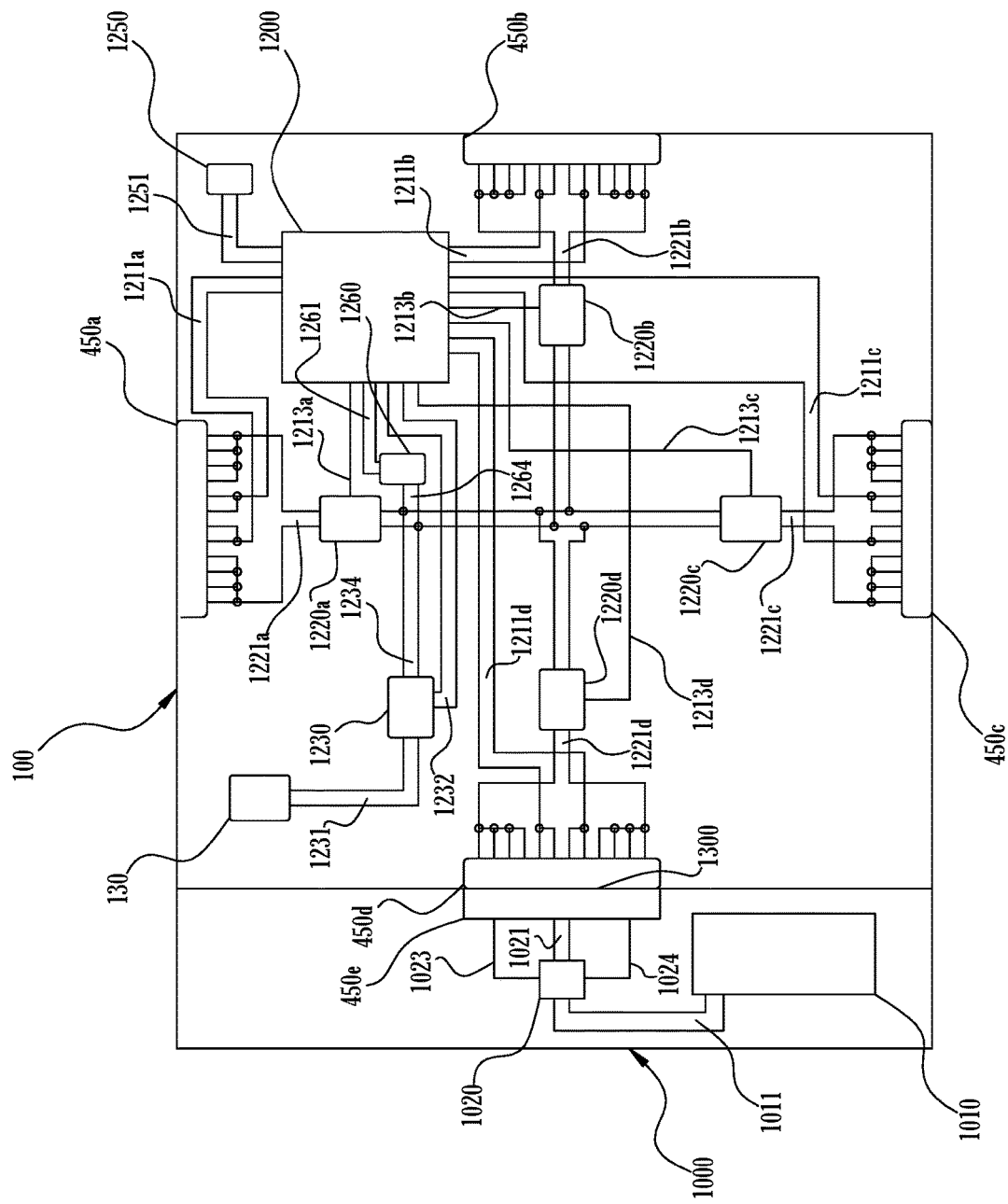
FIG. 12 is a schematic block diagram illustrating one embodiment of an adaptive solar panel connected to a battery module.

FIG. 12 schematically diagrams an adaptive solar panel 100 which is in releasable connection with a battery module 1000. While a battery module 1000 is used for demonstration in this embodiment it may be substituted for alternate adaptive connection unit embodiments. The adaptive solar panel 100 further includes a photovoltaic face 130. While in this embodiment the photovoltaic face 130 covers at least an entire face of adaptive solar panel 100, only a connection point for photovoltaic face 130 is shown in this FIG. 12 (as it is a schematic illustration). Photovoltaic face 130 generates DC power in a range of voltages as is common in the art. Photovoltaic face 130 includes one or more photovoltaic cells connected in series or parallel as is common in the art. Adaptive solar panel 100 further includes a power converting unit 1230. In general, in various embodiments, the term "power converter" (including power converting unit 1230) may refer to any component or set of components that converts electrical power in one form to electrical power of another form. For example, power converters may convert DC power to AC power, convert AC power to DC power, convert an input voltage, current, or frequency (for AC power) to a different output voltage, current, or frequency, or the like.

Power converting unit 1230 may be any variable output voltage regulator or variable output regulator, in some embodiments in combination with an inverter that is common in the art, this includes but is not limited to, any linear voltage regulator, switching voltage regulator, inverter, transformer, or 'microinverter' or any combination of these. In the depicted embodiment, power converting unit 1230 is a switched-mode power converter, in which at least one component such as an inductor, a transformer, or a capacitor, is capable of storing energy in a magnetic or electric field and releasing the stored energy via an output current, and where switching at the input and/or the output of the energy-storing component transforms power in one form (e.g., at an input voltage and current point) to power in another form (e.g., with higher voltage and lower current, or with lower voltage and higher current). For example, power converters for DC to DC power conversion may be buck converters, boost converters, buck-boost converters (inverting or four-switch), transformer-based converters or the like. Various converter topologies may be suitable in different embodiments, depending on the form of the input power, battery voltages, the form of the output power, or the like. Power converting unit 1230 is in electrical communication with photovoltaic face 130 via positive/negative bus 1231.

Adaptive solar panel 100 in the depicted embodiment further includes a controller 1200. The controller 1200 is in electrical communication with power converting unit 1230 via communication bus 1232, such that controller 1200 may modulate the variable voltage output of power converting unit 1230. Further, controller 1200 may receive communication from variable power converting unit 1230 such as real-time voltage readings and/or current readings. A controller 1200, in various embodiments, include discrete hardware components such as power transistors for switching, special purpose hardware such as application-specific integrated circuits, and/or programmable hardware such as a field-programmable gate array. In some embodiments, controller 1200 may include a processor, microprocessor or microcontroller that executes computer-readable program code and may include or be coupled to a memory or storage device to store the code on a non-transitory medium.

In this embodiment adaptive solar panel 100 further includes power switches 1220*a-d*. Depending on power needs power switches 1220 may include mechanical relays, solid state relays, switches, transistors, or any number of electrical switching devices. In this embodiment power switches 1220 are transistors. Power switches 1220*a-d* are in electrical connection with power converting unit 1230 via positive/negative bus 1234. Power switches 1220*a-d* are further in electrical communication with controller 1200 via each respective conductor 1213*a-d* such that controller 1200 may programmatically enable or disable any of power switches 1220*a-d*.

Adaptive solar panel 100 further includes connectors 450*a-d*, which in this embodiment include the features described with regard to FIG. 6. Connectors 450*a-d* are in electrical connection with respective power switches 1220*a-d* via respective positive/negative buses 1221*a-d*. Controller 1200 disconnects any connector 450 when not in use via respective power switch 1220, this is done for safety and for electrical isolation. The method by which this is accomplished is further described with regard to FIG. 13. Controller 1200 is further in electrical communication with connectors 450*a-d* via respective communication buses 1211*a-d*, such that controller 1200 may communicate with other connected adaptive solar panels.

Adaptive solar panel 100 further includes a wireless communication module 1250 in electrical communication with controller 1200 via communication bus 1251. Wireless communication module 1250 utilizes short range wireless technology such as the technologies described in the IEEE 802.15 working group. Wireless communication module 1250 is used to communicate with the user and/or log data to outside devices, such as a smartphone or mobile computer. Further information may be transferred to a remote location (e.g., on the "cloud" or on a remote server).

In some embodiments, an adaptive solar panel 100 is connected to Cloud resources as part of an Internet of Things (IoT) network, allowing the user to remotely manage and monitor the adaptive solar panel 100. Components used to provide this monitoring and management include an Operating System (OS), a Mobile Application (MA), and Cloud Resources (CR), which communicate with each other using various networking technologies, including the internet. These three components, working in unison, allow the adaptive solar panel 100 to be monitored, controlled, and automated, as desired by the user. In some embodiments, the features of the OS (which is integrated into the adaptive solar panel 100) include, but are not limited to, panel controls and updates, providing an API to integrate with home automation solutions such as Amazon Alexa or Google Home, storing the control logic for power allocation, and serving as the integration and communication gateway with the MA and CR. In some embodiments, the OS may also interface with internal sensors such as current, voltage, etc., in order to properly monitor and manage the adaptive solar panels 100, as well as adaptive connection units. In some embodiments, the MA is not only able to remotely monitor and control the adaptive solar panel 100 but may also provide the user with machine-learning determined energy consumption and demand prioritization recommendations based on real-time and historical energy consumption metrics, including data visualizations of optimal energy usage patterns. This may prove especially useful in managing multiple demands.

In some embodiments, adaptive solar panel 100 is connected to a user's cloud account which provides services to the user, including, but not limited to: creating a communication bridge between the OS and the MA when the user is not within Bluetooth connectivity distance or on the same local network (e.g. a local Wi-Fi network) to allow the user to continue remote management and monitoring; a central repository providing long-term data aggregation and storage of data that is uploaded regularly by the OS to augment the storage available in the adaptive solar panel 100 and to allow access to historical and current data by the user; and serving as a diagnostic tool for customer service. In some embodiments, the mobile app will also access, utilize, and analyze this data collection to provide smart energy consumption recommendations.

In some embodiments, a user's cloud repository may also serve as the basis for a management service, where representatives (with the permission of the user) may review the analyzed data and recommend how to further manage electricity use while still maintaining the same level of comfort. In some embodiments, this may also include real-time alerts sent to the mobile app based on the uploaded data compared to the statistical norm for each connected appliance. In a non-limiting example, if the data analysis shows a sudden spike in energy used by a given demand, and a real-time alert would inform the user so they can check the given device.

In some embodiments, with permission from the user, data may be collected and aggregated from multiple connected adaptive solar panels 100 and used for further diagnostic insights, such as profiling different geographical locations based on usage, determining where further upgrades can make the system even more efficient, user-friendly and providing profiles for resellers and other interested parties on which systems and accessories are most utilized in various locations, to name a few non-limiting examples.

Battery module 1000 includes a battery module 1010 and a controller 1020. Battery module 1010 is in electrical connection with controller 1020 via positive/negative bus 1011. Battery module 1000 further includes connector 450*e* which is in electrical connection with controller 1020 via positive conductor 1023 and negative conductor 1024 and in electrical communication via bus 1021. Battery module 1000 and adaptive solar panel 100 have just been placed in connection via connector 450*e* and connector 450*d* at location point 1300. Controller 1200 is sending a communication message at a high frequency to each connector 450*a-d*, in this embodiment the frequency is every two-hundred milliseconds, in other embodiments this may be another frequency. Since battery module 1000 has just been placed in connection, controller 1020 receives the message from controller 1200. Controller 1200 responds with a message back to controller 1200. Following this response, controller 1200 places power switch 1220*e* in a connected state creating a circuit between photovoltaic face 130 and controller 1020. Controller 1200 continues to message controller 1020 every two-hundred milliseconds (this amount of time may vary in other embodiments), if a response is not received it disables power switch 1220*e*. In an alternative embodiment an electromechanical switch may be located at each connector 450 which senses connection or disconnection of adaptive solar panel 100 and accordingly connects or disconnects the appropriate power switch 1220 directly, or via controller 1200.

In this embodiment, battery 1010 is discharged and this battery state is read in by controller 1020 (using a voltage reading or other methods common in the art). Thus, controller 1020 completes the circuit between photovoltaic face 130 and battery 1010. As power flows from photovoltaic face 130 power converting unit 1230 preforms maximum power point tracking ("MPPT") (as is common in the art).

Additionally, power converting unit 1230 modulates voltage output to permit efficient transmission depending on the current load. Controller 1200 receives voltage output readings from power converting unit 1230 and communicates this information to the charge controller 1020. Charge controller 1020 receives the expected power from power converting unit 1230. Charge controller 1020 modulates output voltage and current to the battery 1010 in a bulk, absorption, float, equalization, or other programmatically selected charge profile. Charge controller 1020 communicates this information back to controller 1200 such that controller 1200 may further use this information to optimize the modulation at converting unit 1230.

Adaptive solar panel 100 further includes in the depicted embodiment a variable load module 1260 in electrical communication with controller 1200 via communication bus 1261. Variable load module 1260 is further in electrical connection with power converting unit 1230 via positive/negative bus 1264 and 1234. Variable load module 1260 is used to generate loads for testing purposes. In this embodiment, variable load module 1260 includes a MOSFET and heat sink, although alternate means may be used in other embodiments. Controller 1200 communicates with variable load module 1260 to generate given test loads. Power converting unit 1230 performs MPPT functions (in the same way it would with any non-test load) and the MPPT setpoints are saved by controller 1200. In this way, the system delay associated with MPPT setpoint searching (when a non-test load is attached) is eliminated. Elimination of this delay results in a responsive system where loads, such as adaptive connection units are more rapidly available to the user. The information stored in controller 1200 includes power capacity data for individual adaptive solar panels 100 (which may be affected individually by shading or other environmental conditions) and aggregated as a power capacity data point for the entire modular power production system 200. In this way, a user may obtain an approximation of the power available in their system 200 in order to understand what loads may be powered using the system; further they may gain insights based on data, including power available at given times of day, and the like. The load module 1260 and power converting unit 1230 MPPT setpoint functions may be initiated programmatically by controller 1200 on regular intervals or upon user input (such as when the user desires to know the power capacity of modular power production system 200).

Figure 13:
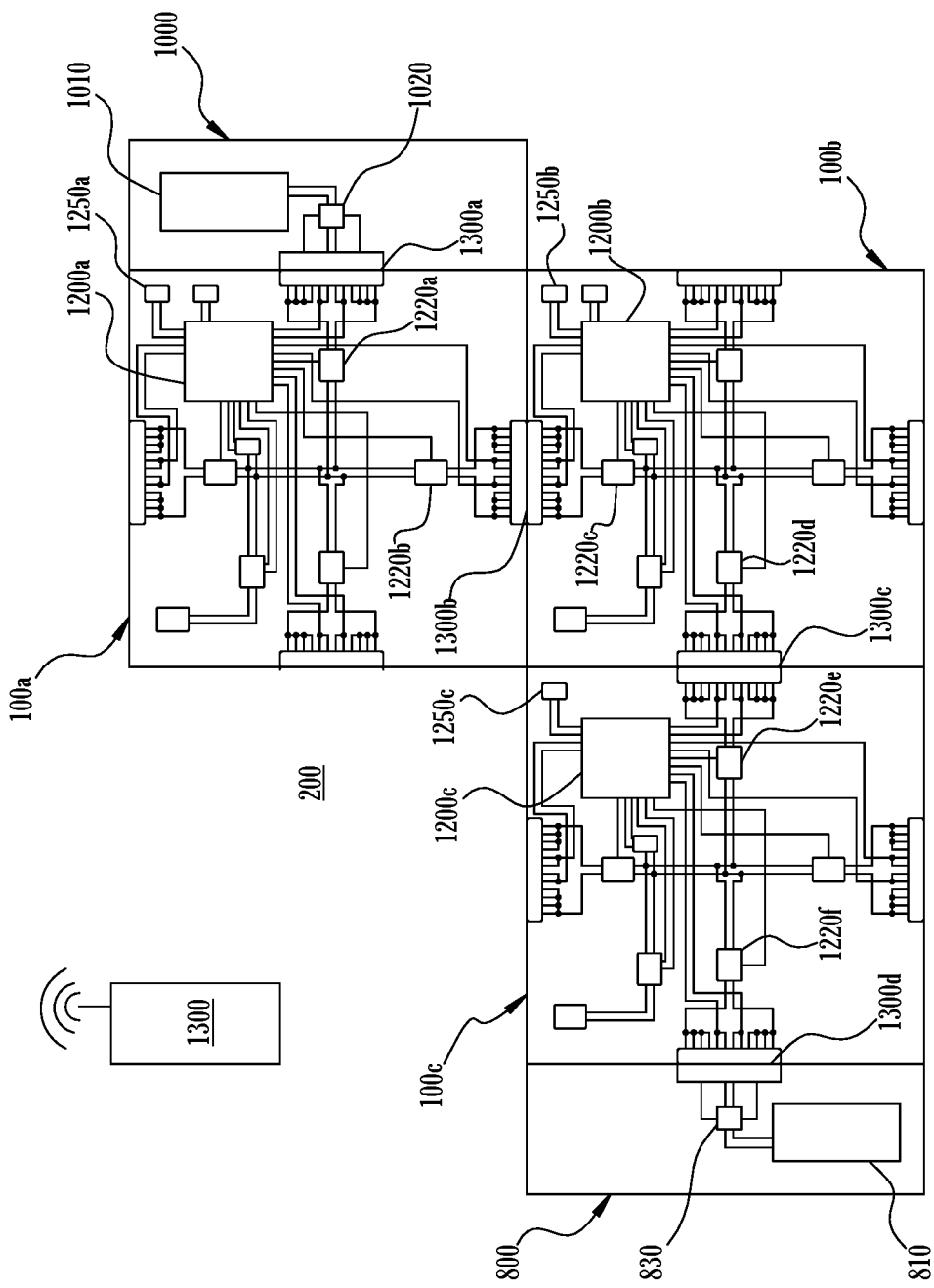
FIG. 13 is a schematic block diagram illustrating one embodiment of a modular power production system comprising an array of adaptive solar panels connected to a battery module and a light module.

FIG. 13 schematically diagrams modular power production system 200 including an array of adaptive solar panels 100*a-c* which include elements as described with regard to previous FIGS. and that may be schematically similar to the adaptive solar panel 100 as described with regard to FIG. 12. Modular power production system 200 further includes battery module 1000, light module 800 and user interface 1300. Adaptive solar panels 100*a-c* are releasably connected at junction points 1300*b-c*. Adaptive solar panel 100*a* is releasably connected at junction point 1300*a* to battery module 1000 which is schematically identical to the battery module 1000 from FIG. 12. Adaptive solar panel 100*c* is releasably connected to light module 800 at junction point 1300*b-c*. Light module 800 is schematically similar to battery module 1000 from FIG. 12 with two deviations: 1) that battery 1010 is replaced with an illumination device 810 and 2) that charge controller 1020 is replaced with light controller 830. Power switches 1220*a-e* are in a state of connection due to the fact that their respective controllers 1200*a-c* are recording a connection at respective connectors. All other power switches 1220 are in a disconnected state.

In the depicted embodiment battery module 1000 has been connected for a few hours and the battery 1010 is in a state of half charge and is currently in an absorption charging sequence. Power is being routed from each adaptive solar panel 100*a-c* to battery 1010. Light module 800 and adaptive solar panel 100*c* have just been placed in connection, communication is established between light controller 830 and controller 1200*c* (per the process described with regard to FIG. 12) and power switch 1220*f* is set to the connected state. Controller 1200*c* determines that it is (itself) directly connected to light module 800. Controller 1200*c* has recorded data indicating that controller 1200*a* is directly connected to battery module 1000; additionally, controller 1200*c* has record of the power requirements of battery module 1000. Controller 1200*c* has further recorded data indicating that the power production capacity of modular power production system 200. Controller 1200*c* makes the determination that modular power production system 200 cannot supply power to both light module 800 and battery module 1000 and further determines that light module 800 has programmatic priority over battery module 1000. Controller 1200*c* relays this determination to light controller 830 and controller 1200*b*. Controller 1200*b* relays the determination to controller 1200*a*. Controller 1200*a* relays the determination to battery controller 1020. Using this determination, battery controller 1020 cuts power to battery 1010 and light controller opens power to illumination device 810. Controllers 1200*a-c* each relay this determination to respective wireless modules 1250*a-c*. Wireless module 1250*a-c* each relay the determination to user interface 1300, (which in this embodiment is a smartphone 1300). Smartphone 1300 presents this determination state to the user via a smartphone application. Controllers 1200*a-c* further make determinations regarding varying power output between solar panels 100 and optimize output via MPPT on a per panel 100*a-c* basis (e.g., where an adaptive solar panel 100 that is under shade or where adaptive solar panels 100 are of varying size, the methods whereby this MPPT is used are common in the art).

In this embodiment, the programmatic priority of light module 800 over battery module 1000 is hard coded, in other embodiments this prioritization may be user controlled; alternatively, prioritization may be updated by the manufacturer through updates ("over the air" or manual). In some embodiments, prioritization may be based on set rules like the type of product connected; if the product is one that can communicate with the system 200 (such as light module 800 or battery module 1000) the system 200 may prioritize regarding product type (such as battery or light). If the load is not in communication with the system 200, such as loads generated by products of another manufacturer, the system 200 may not be able to ascertain the product type, however other data can be obtained such as whether the load is AC or DC, power, voltage, and current requirements and the like. Additionally, the user (or code) may prioritize given connectors in the system 200 (whether on an adaptive solar panel 100 or an adaptive connection unit), this may be useful when product type is unavailable, such as when the user always connects a lower priority load to a given connector. In some embodiments, prioritization rules may be based on other parameters such as sequence in which the load was connected, electrical characteristics or power requirements. In certain embodiments, prioritization may be based on any one parameter or combination of parameters.

The invention claimed is:
1. A system comprising:

a plurality of adaptive solar panels comprising photovoltaic faces and connective edge faces, the connective edge faces each comprising a panel connection interface comprising both a male connection interface and a female connection interface such that each of the plurality of adaptive solar panels are releasably affixed to an adaptive solar panel of the plurality of adaptive solar panels via both the male connection interface and the female connection interface in configurations adaptive to surfaces and environmental geometric space constraints, the connective edge faces each further comprising a panel electrical connector such that the plurality of adaptive solar panels are releasably electrically connectable; and one or more adaptive connection units comprising unit connection interfaces such that the one or more adaptive connection units are releasably affixed to the plurality of adaptive solar panels via the male connection interface and the female connection interface, the one or more adaptive connection units further comprising one or more connection electrical connectors such that the one or more adaptive connection units are releasably electrically connectable to the plurality of adaptive solar panels.

2. The system of claim 1, further comprising:

one or more power loads connected to the one or more adaptive connection units;

one or more power converting units located in each of the adaptive solar panels, the one or more power converting units in electrical connection with the photovoltaic faces and the panel electrical connector such that power is relayed from the photovoltaic faces through a configuration of the plurality of adaptive solar panels to the one or more power loads; and one or more controllers located in each of the adaptive solar panels, the one or more controllers in electrical communication with the one or more connection electrical connectors such that the one or more controllers in the plurality of adaptive solar panels are in electrical communication with an adaptive solar panel of the plurality of adaptive solar panels, the one or more controllers being further connected to the one or more power converting units.

3. The system of claim 2, wherein the one or more controllers are configured to programmatically control a prioritization, connection, and disconnection of the one or more power loads according to power availability.

4. The system of claim 3, wherein the programmatic control is user defined.

5. The system of claim 1, wherein the panel connection interfaces and the unit connection interfaces comprise magnets configured to releasably retain the plurality of adaptive solar panels and the one or more adaptive connection units.

6. The system of claim 1, wherein the panel connection interfaces and the unit connection interfaces comprise an extrusion and a receiving pocket configured to releasably retain the plurality of adaptive solar panels and the one or more adaptive connection units.

7. The system of claim 1, wherein the panel connection interfaces and the unit connection interfaces comprise an extendable shape and a receiving pocket configured to releasably retain the plurality of adaptive solar panels and the one or more adaptive connection units.

8. The system of claim 1, wherein the plurality of adaptive solar panels further comprises a variable load module in electrical communication with a controller, the variable load module configured to introduce loads to the plurality of adaptive solar panels and to test a power output capability.

9. The system of claim 1, further comprising wireless communication modules located in each of the adaptive solar panels.

10. The system of claim 1, wherein the one or more adaptive connection units further comprise a controller configured to monitor and modify power usage.

11. The system of claim 1, wherein the panel connection interfaces and the unit connection interfaces are identical.

12. The system of claim 1, further comprising a plurality of electrical power switches in each of the adaptive solar panels, the electrical power switches located electrically between power converting units and the panel electrical connectors, the plurality of electrical power switches further in electrical communication with one or more controllers such that the electrical power switches disable in response to the panel electrical connectors' disuse.

13. The system of claim 1, wherein the unit connection interfaces further comprise an electromechanical switch configured to relay a connection state of the unit connection interfaces to the plurality of adaptive solar panels.

14. The system of claim 1, further comprising one or more direct current to alternating current power converting units.

15. The system of claim 1, wherein the one or more adaptive connection units are configured to convert direct current power to alternating current power.

16. The system of claim 1, wherein the one or more adaptive connection units are configured to convert alternating current power to direct current power.

* * * * *